May 27, 1958  H. J. WAECHTER  2,836,353

RELEASE MECHANISM FOR CASH DRAWERS

Filed Aug. 30, 1952  5 Sheets-Sheet 1

INVENTOR.
Harry J. Waechter.
BY
Wood, Herron & Evans.
ATTORNEYS.

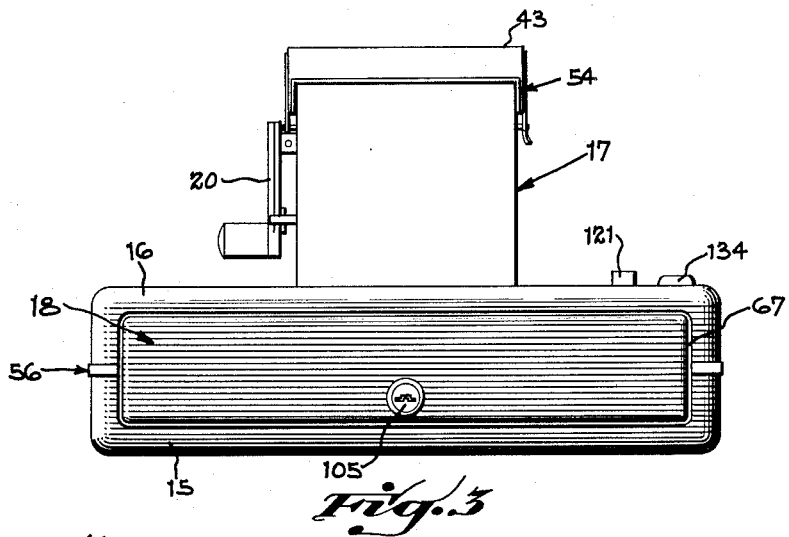
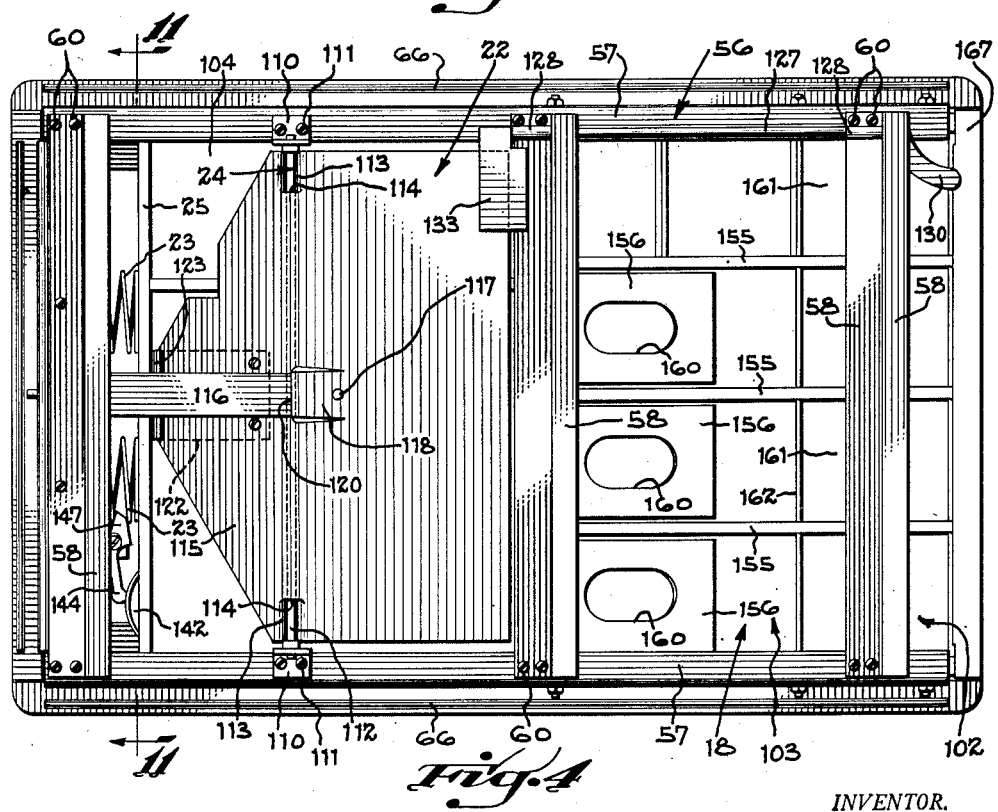

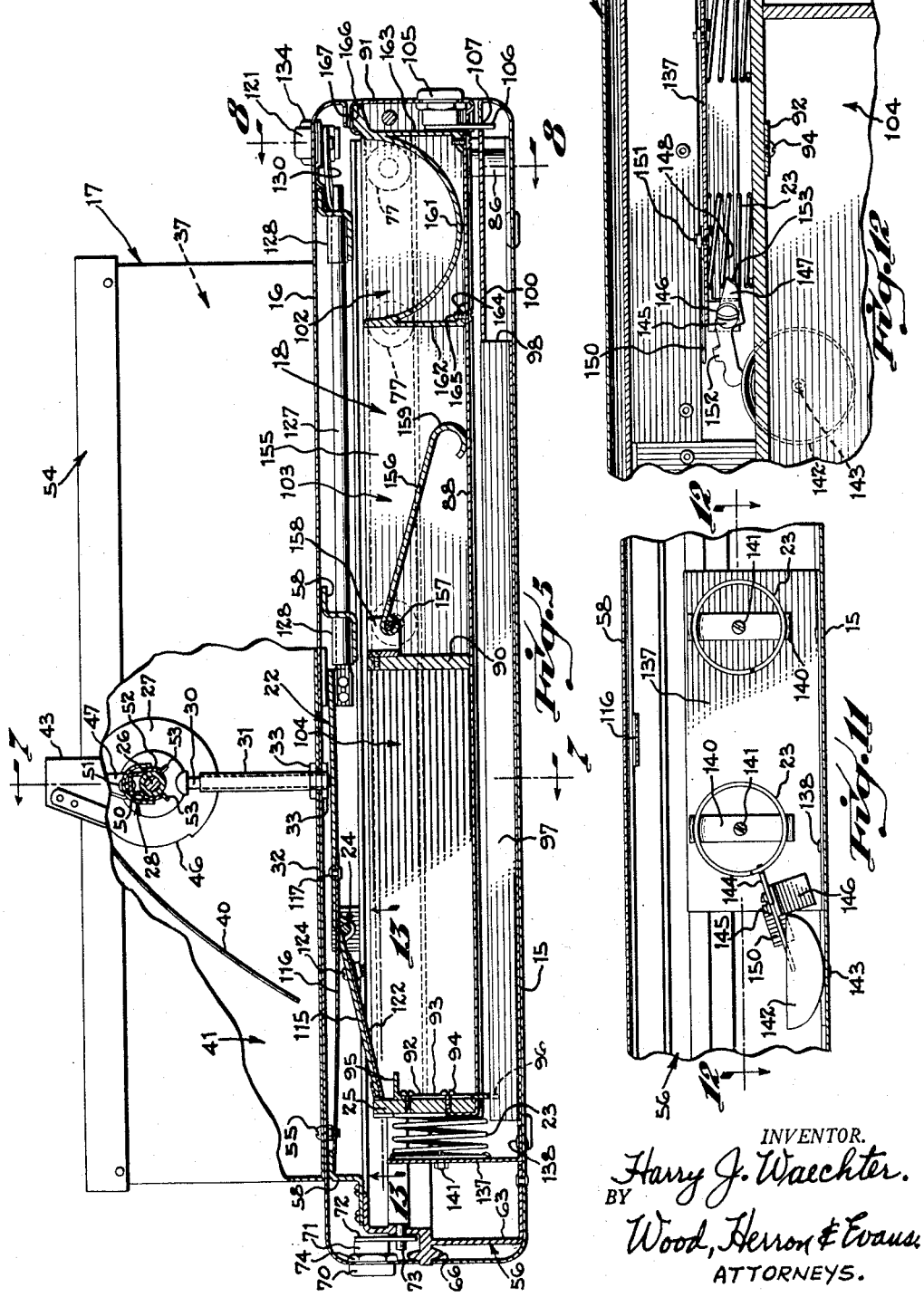

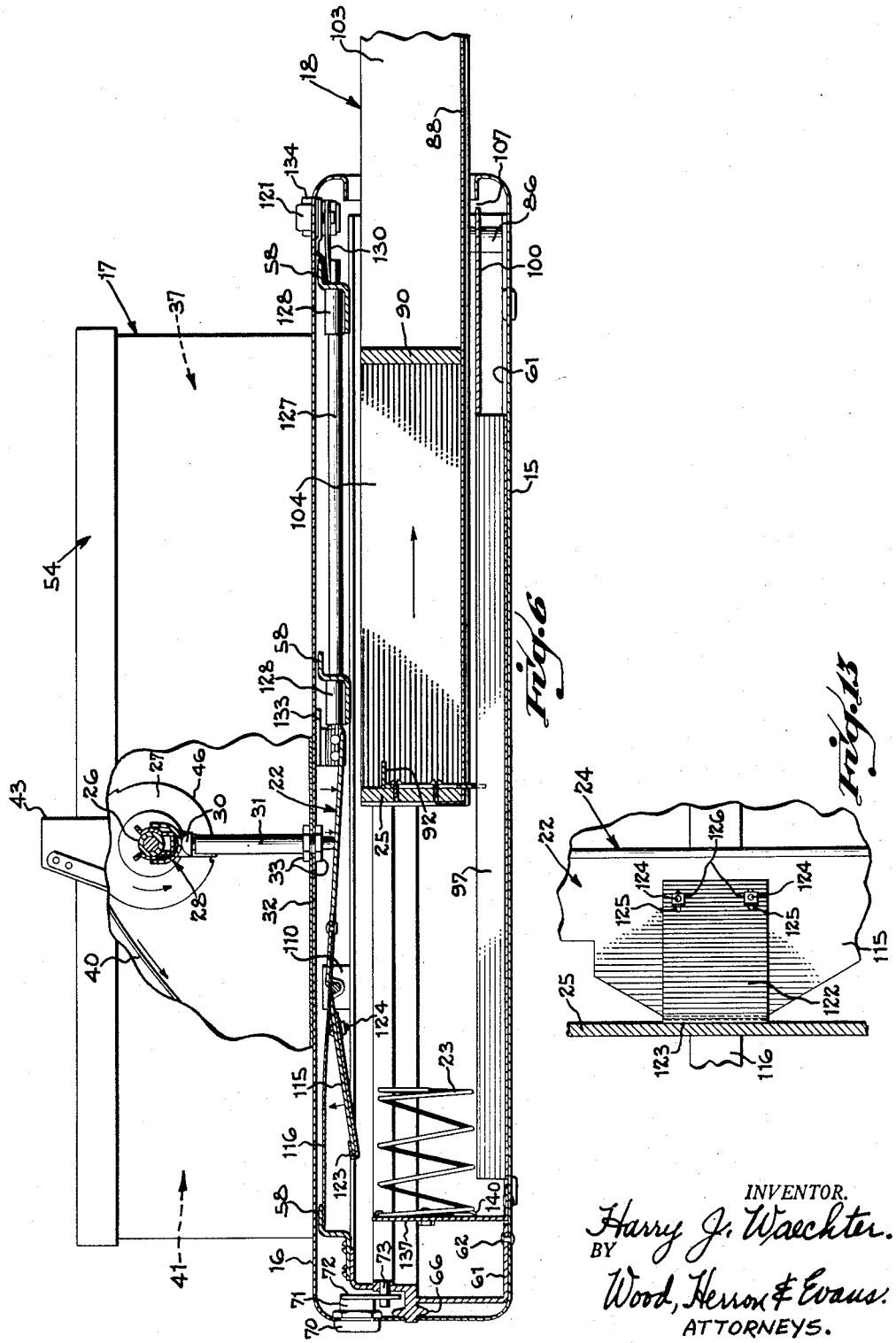

May 27, 1958     H. J. WAECHTER     2,836,353
RELEASE MECHANISM FOR CASH DRAWERS
Filed Aug. 30, 1952     5 Sheets-Sheet 5
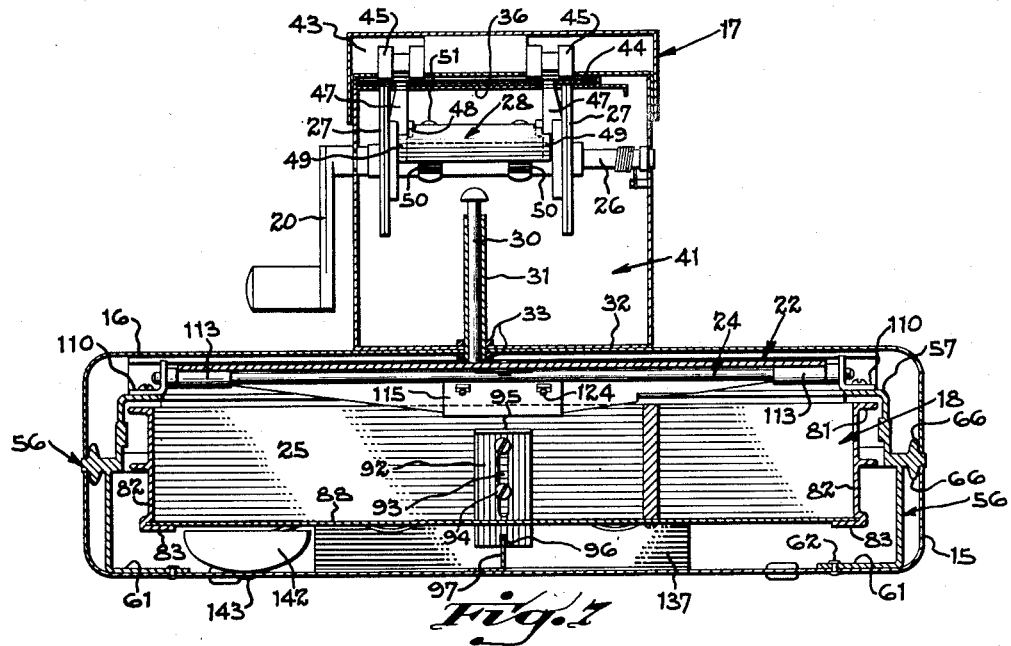
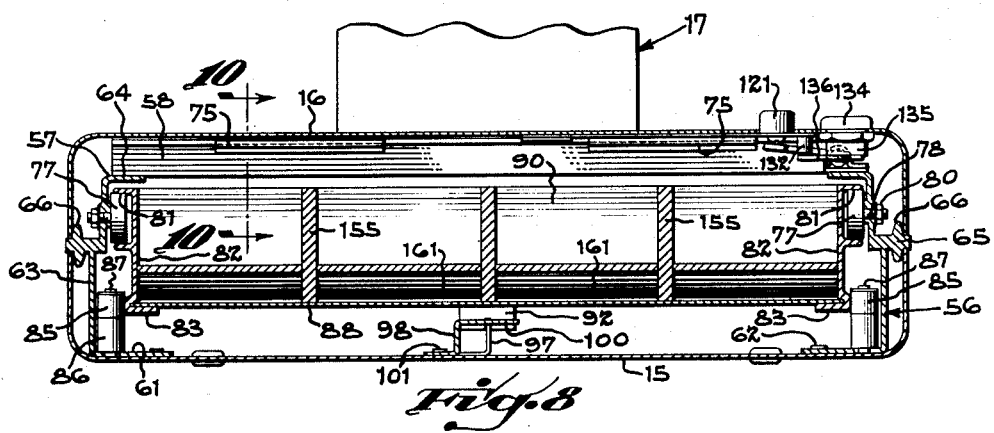
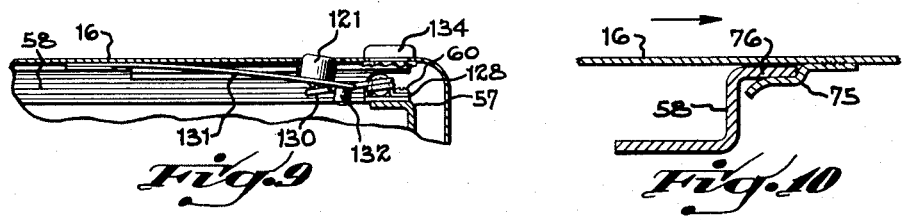
INVENTOR.
Harry J. Waechter.
BY Wood, Herron & Evans.
ATTORNEYS.

United States Patent Office 2,836,353
Patented May 27, 1958

2,836,353

RELEASE MECHANISM FOR CASH DRAWERS

Harry J. Waechter, Mount Healthy, Ohio, assignor to Paul Benninghofen and F. B. Diesbach, Hamilton, Ohio, as trustees Application August 30, 1952, Serial No. 307,343

2 Claims. (Cl. 235—22)

This invention relates to improvements in cash drawer units which are used in sales transactions involving the handling of money, particularly checks, bills and coins of different denominations. Cash drawer units of this nature are used extensively in various types of business operations in place of the standard recording cash registers where volume, in terms of unit sales, or the type of transaction does not justify the use of more complex and expensive cash registers.

Broadly speaking, the cash drawer unit is not a new development, it has been in use for years in merchandising fields for which it is peculiarly fitted. However, the units produced up to the present time usually are constructed of wood and are rather primitive both in structure and operation; consequently, they do not harmonize well with modern store fixtures and merchandising methods.

Briefly, the present invention resides in an improved, streamlined, self-contained unit constructed from metal and presenting a number of structural and functional improvements over conventional cash drawer assemblies. Described generally, the cash drawer organization to which the present invention is addressed, consists of a cabinet or drawer housing containing a slidable, spring propelled drawer, the cabinet having latching mechanism arranged to latch the drawer normally in closed position and arranged to release the drawer allowing it to spring to open position when needed.

The present cash drawer unit is usually, but not always, associated with a business machine such as an adding machine or autographic register for coordinated operation. When used in combination, the business machine is mounted upon the top of the cabinet and mechanically connected to the drawer latching mechanism. By this arrangement, operation of the business machine is effective to trip the latching mechanism, causing the drawer to spring open automatically so that the money involved in the transaction may be deposited in the drawer and the necessary change selected conveniently. The drawer is provided with suitable compartments to segregate the various denominations of checks, bills, and coins for convenience in making change.

One of the primary objects of the present invention has been to provide a cash drawer unit which includes an improved drawer latching mechanism adaptable in a convenient manner to practically any of the business machines presently on the market such that existing machines can be installed upon the cash drawer units by the users.

In general, the drawer cabinet or housing of the present invention is rectangular in the horizontal plane and is considerably larger in area than the average business machine. The housing is relatively low and the machine is mounted directly upon the top surface of the housing at a convenient height for operation. The drawer latching mechanism includes a release plate having an extensive area which extends substantially for the full width of the cabinet. This plate is located directly beneath the top of the housing in a horizontal plane and arranged to release the drawer upon being depressed. By virtue of the extensive area of the release plate, the mechanical interconnection from the business machine to the plate is extremely flexible, in respect to location, permitting the machine to be placed upon the housing at practically any desired position. This accommodates the drawer assembly to various types of adding machines, autographic registers and similar machines and makes the installation procedure extremely simple.

A further object has been to provide an easily installed cooperating cam and plunger mechanism, the cam being arranged to be attached conveniently to existing business machines and the plunger adapted for convenient attachment to the drawer housing to provide the mechanical interconnection between the machine and the drawer release mechanism. The cam structure is intended particularly for autographic registers and adding machines of the class which includes a rotatable shaft suitable to rotate the cam. In the case of adding machines, registers and the like which do not include a shaft of this character, other means are used to actuate the plunger.

Further objects of the invention have been to provide a separable housing having a removable top section for convenience in installing the business machine upon it, the housing sections being so arranged that it is virtually impossible for a thief to pry apart the sections to gain access to the drawer.

In addition to the above features, the cash drawer unit is further provided with means which provide convenient removal of the drawer from the housing; it is also provided with improved locking means adapted to lock the housing sections in assembly and the drawer in closed position.

As explained above, the drawer is propelled to open position upon release by means of coil springs and another feature of the invention resides in the structural arrangement of a signal bell which takes advantage of the expanding coil springs to strike the bell as the drawer springs open.

The cash drawer unit is intended to be used either in conjunction with or independently of a business machine and for this purpose it is provided with a manual drawer release mechanism. The arrangement is such that the manual release is operable when the unit is used either alone or with the machine installed upon it; thus, in either event the drawer may be opened manually whenever desired. A lock is associated with the manual release mechanism to decommission the mechanism when necessary.

Further features and advantages of the invention are disclosed in detail in the following detailed description in conjunction with the drawings.

In the drawings:

Figure 3 is an elevation of the assembly as viewed from the drawer end.

Figure 4 is a top plan view with the cash drawer in closed position, with the top cover of the drawer housing removed to illustrate the general relationship of the parts.

Figure 5 is a longitudinal sectional view taken on line 5—5, Figure 2, detailing the cash drawer structure and the mechanism interconnecting the autographic register with the drawer latching mechanism for opening of the drawer in response to operation of the autographic register.

Figure 6 is a longitudinal sectional view similar to Figure 5, showing the latching mechanism in tripped position with the drawer spring propelled to open position.

Figure 7 is a cross sectional view taken on line 7—7, Figure 5, further detailing the trip mechanism of the autographic register and its relationship with the drawer latching mechanism.

Figure 8 is a cross sectional view taken on line 8—8, Figure 5, detailing the drawer mounting and the hand trip mechanism which provides release of the drawer without operation of the autographic register.

Figure 9 is a fragmentary sectional view taken from Figure 8, showing the manual tripping mechanism in drawer release position.

Figure 10 is an enlarged fragmentary sectional view taken on line 10—10, Figure 8, detailing the locking flange of the top housing.

Figure 11 is a sectional view taken on line 11—11, Figure 4, illustrating the drawer propelling springs and bell ringing mechanism.

Figure 12 is a sectional view taken on line 12—12, Figure 11, further illustrating the mechanism of Figure 11.

Figure 13 is an enlarged fragmentary sectional view taken on line 13—13, Figure 5, detailing the adjustment plate for the drawer latching mechanism.

GENERAL STRUCTURE AND OPERATION

Figure 1:
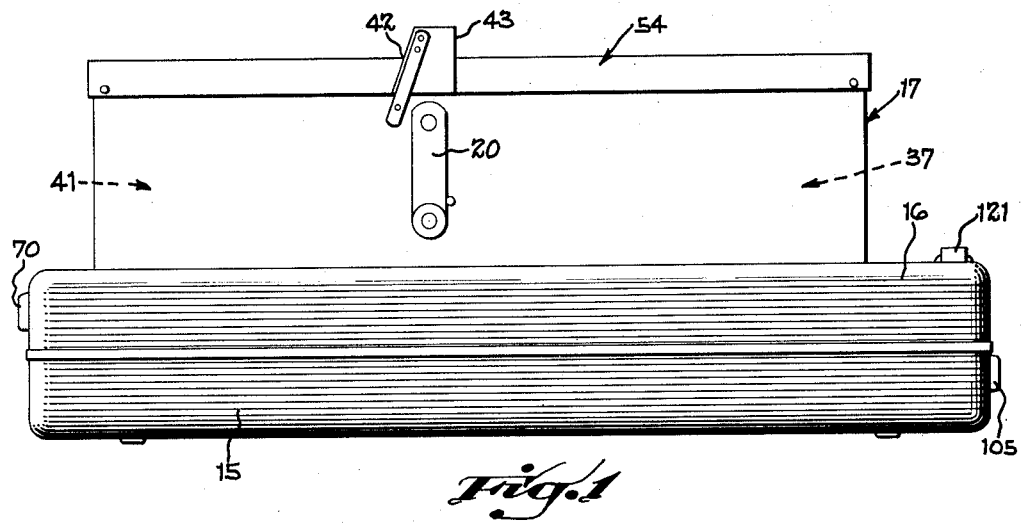
Figure 1 is a general side view of the cash drawer assembly with an autographic register mounted upon it and interconnected with the drawer latching mechanism for automatic opening of the drawer upon operation of the register.
Figure 2:
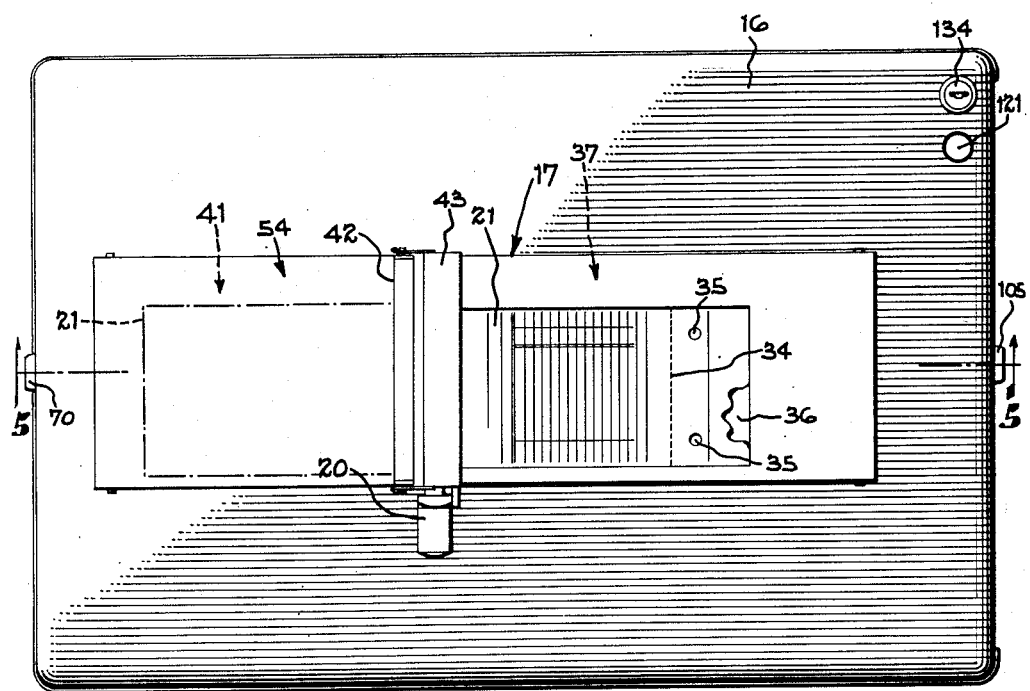
Figure 2 is a top plan view projected from Figure 1, further illustrating the general arrangement.

Referring to Figures 1 and 2, the present cash drawer unit consists of a sheet metal housing having a bottom section 15 and a removable top section 16 upon which is fastened the business machine. For purposes of illustration only, a crank operated autographic register indicated generally at 17 is disclosed but it will be understood that adding machines and other business equipment are mounted in substantially the same manner. Slidably mounted within the housing is a cash drawer indicated generally at 18 in Figures 3, 5 and 6, the cash drawer being arranged to spring to open position (Figure 6) when the crank 20 of the register is rotated. The register is adapted to advance a sales slip, indicated at 21, when the crank is rotated.

As explained earlier, it was one of the objectives to provide a self-contained cash drawer assembly which can be interconnected with practically any of the commercial business machines, regardless of proportions or mechanism. To accomplish this, the drawer latching mechanism includes a trip plate 22 (Figure 4) which is located in a horizontal plane immediately beneath the top cover. This plate provides an extensive area and is effective, upon being pivoted downwardly, to release the cash drawer, causing it to spring to open position under the influence of the coil springs 23—23. The latching mechanism is described in greater detail later in this specification, but it will be understood at this point that the plate is pivoted as at 24 (Figures 4, 5 and 6) and that its rearward end engages the rear cross member 25 of the drawer to lock the drawer normally in closed position.

The business machine selected for illustrating purposes is an autographic register of the type shown in the patent to Harry J. Waechter, No. 2,140,065, issued on December 13, 1938. This machine includes a cross shaft 26 which is rotated by the crank 20 and carries the feed disks 27—27 which advance the manifold sheets when the shaft is rotated.

In order to interconnect this particular register with the latching mechanism of the cash drawer, the shaft 26 is provided with a cam attachment indicated generally at 28 which is adapted to engage the upper end of plunger 30, causing the plunger to be depressed upon each rotation of the shaft. The lower end of plunger 30 bears against the upper surface of trip plate 22, such that upon each rotation of shaft 26, the plate is depressed.

This elevates its rearward end out of engagement with the drawer cross member 25, allowing the coil springs to propel the drawer to open position.

As best shown in Figure 7, plunger 30 is slidably confined in a plunger tube 31 and the lower end of the tube passes through the bottom plate 32 of the register and through the top cover 16. Nuts 33 are threaded upon the tube and serve to clamp the tube in vertical position and also to clamp the autographic register in position upon the cover 16.

In order to adapt the cash drawer unit to various business machines, the tube and plunger assembly and the cam attachment are furnished to the purchasers of the units. Referring to Figure 7, the cam 28 extends transversely across the register and is adapted to be snapped upon the shaft 26 under spring engagement as later explained.

Since the trip plate 22 extends transversely substantially for the full width of the cash drawer unit, the plunger may be installed at any convenient location, depending upon the design of the business machine, with respect to the width of the cash drawer unit. The plate also extends longitudinally of the drawer assembly for a substantial distance and this allows the plunger to be located lengthwise of the drawer unit in a position best suited to the design of the machine. It is therefore a simple matter to drill a hole through the bottom of the autographic register and cash drawer housing to mount the tube and plunger assembly.

It will be understood that the plunger must be located substantially in vertical alignment with the axis of shaft 26 as shown in Figure 5 in order to provide the proper camming action. Suitable modifications in the cam are contemplated in order to adapt it to the various available types of autographic registers, adding machines and the like. Other mechanical means, as dictated by the structures of the business machines, may be provided to interconnect the machine to the release mechanism of the cash drawer.

Cam and plunger structure

In the register or manifolding machine selected to exemplify the invention, the register feeds multiple sales slips in continuous strip form. This type of sales slip is common to the autographic registers, the purpose being to provide the purchaser with a copy of the sales slip. In order to provide several copies, the strips are superimposed one upon another with carbons interleaved between them and the continuous web is usually subdivided by transverse lines of perforations indicated at 34 (Figure 2), which provide tear lines for severing the individual slips. In addition, the strip includes apertures 35—35 which provide for engagement by a pair of rotating teeth for aligning the strips upon each cycle of operation.

The manifolding machine includes a platen or writing table 36 which supports the forms in position to be filled out by hand, and the full length strip is stored in a storage compartment of the machine, as indicated generally at 37, beneath the writing table. Upon rotation of the crank, the customer's copy, together with a cashier's copy if necessary, is advanced. As shown in Figure 6, a continuous record copy indicated at 40 is also fed into the storage compartment indicated generally at 41. When the customer's copy is fully advanced, the perforated line 34 will align itself with the tear-off edge 42 of roller housing 43, allowing the copies to be conveniently torn from the web.

As best shown in Figure 7, the continuous strip, indicated at 44 is engaged between the feed disk 27—27 and the feed roller 45 so that the strip is frictionally engaged and advanced upon rotation of disks 27—27 during crank rotation. It will be noted in Figure 5 that the disks 27 include a relieved non-feeding portion 46, during which rotation of the disks is ineffective to advance the strip. The feed fingers 47—47 are mounted adjacent the disks 27 (Figure 7) and it will be noted in Figure 6 that the feeding engagement of the disk is terminated before the fingers 47 engage the apertures 35.

It will be noted also in Figure 6 that the cam 28 is substantially in alignment radially with the feed fingers so that the plunger 30 is depressed while the sales slip is advancing from the register. Thus, before the sales slip is completely advanced, the cash drawer will open to allow the clerk to deposit money, and if necessary, to make change.

From the foregoing, it will be understood that practically any business machine which has a moving part, can be attached to the drawer housing for coordinated operation. One example of such a machine is a conventional adding machine of the type arranged to provide, in an automatic manner, a printed record of the day's business. When such a device is used in conjunction with the cash drawer, the data is recorded by pressing the keys in the usual manner; this causes the fingers to be printed on a tape and also causes the drawer to open. If the moving part is a rotating or oscillating shaft, a cam similar to, or a modified version of the above, is used. If the machine has no shaft of this character but includes a lineally moving part, a suitable inclined reciprocating cam may be used to depress the plunger.

In the cam structure disclosed in Figure 7, the cam 28 is formed of sheet metal and is generally U-shaped in cross section. In order to provide a non-rotatable connection with the shaft, the opposite ends of the cam are cut way as indicated at 48 to interfit with the feed fingers 47. The slotted ends thus provide end extensions 49—49 which overlie the finger on opposite sides to key the cam to the fingers for unitary rotation.

It will be seen in Figure 7 that the cam assembly is provided with a pair of spring clips 50—50 which are secured near the opposite ends of the cam by rivets 51—51. Referring to Figure 5, the spring clips are generally U-shaped in cross section and are provided with partially cylindrical portions 52—52 which embrace the opposite sides of shaft 26. The clips are fabricated from flat spring stock and their free ends are flared outwardly as at 53—53 adjoining the partially cylindrical portions to provide a wedging action when the assembly is pressed into position upon the shaft 26.

It will be understood that the top cover structure indicated generally at 54 of the autographic register is adapted to be raised upwardly to allow the cam assembly to be applied over the outer ends of the feeding fingers and slipped downwardly into spring engagement with the shaft. The web of forms is then threaded between the feed disks and rollers and with the plunger installed, the machine is ready for operation. In order to provide a more secure mounting of the autographic register, the attachment may be strengthened by applying one or more screws as indicated at 55 in Figure 5.

*Drawer housing*

As best shown in Figures 4 and 5, the housing for the cash drawer includes an interior frame of rigid construction indicated at 56 upon which is anchored the several components of the assembly. The frame forms a rigid skeleton for the sheet metal housing sections and is constructed preferably of extruded aluminum or alloy sections forming a pair of side rails and a cross rail of identical cross section. As best shown in Figure 4, the two side rails 57 are braced by means of cross braces 58 which have their opposite ends secured by screws 60 to the side rails.

The side rails 57 and cross rail of frame 56 each include a base flange 61, a vertical web 63, and an overhanging top flange 64. The base flange is fastened to the lower housing section 15 by rivets 62. In addition to the top and base flanges 64 and 61, the metal extrusions include a transverse rib 65 which provide a meeting flange between the adjoining edges of the upper and lower sheet metal housing sections. It will be noted in Figures 5 and 7 that the transverse flange 65 includes vertical ribs 66—66 which project outwardly from the flange 65 on opposite sides and lie in contact with the adjoining marginal inner surfaces of the top and bottom housing sections. The purpose of rib 66 is twofold; first, to provide a telescopic engagement with the edge of the removable top section so as to maintain it in proper alignment and secondly, to prevent forcible entry or prying open of the housing by forcing a screwdriver or similar tool between the flange and housing edge.

As shown in Figure 3, the forward end of the casing is open as indicated at 67 to receive the drawer, the rearward end, of course, being closed. The removable top section 16 is locked to the internal frame at the rearward end by means of a conventional cylinder lock 70 of the type having a rotatable barrel 71 upon which is fastened a hook 72 adapted to engage a lock pin 73. Lock 70 projects outwardly through the end wall of the upper section and is clamped in position by the lock nut 74 in the usual manner. Upon inserting a key, the barrel is rotated to engage or disengage the hook relative to the pin.

The forward or open end of the upper housing section is locked down by means of the clips 75 (Figure 10) which are welded to the under side of the section as shown. The clips underlie the horizontal flange 76 of the forward cross brace 58 when the section is locked in position. The relationship of the clips 75 is best shown in Figure 8, there being provided two of them fastened at transverse spacing in the upper section.

It will be noted that the forward end of housing section 16 can be released by shifting it in the direction indicated by the arrow in Figure 10. In removing the section, it is necessary first to unlock the rearward end by inserting a key in lock 70 and rotating the barrel to disengage hook 72 from pin 73, permitting the rearward end to be lifted upwardly. When the lower edge of the section is raised above the upper edge of rib 66, the section can be shifted forwardly as indicated in Figure 10, a sufficient distance to release the clip 75. Upon release, the cover, with the autographic register mounted upon it, may be removed bodily from the lower section.

As explained above, the internal frame including the cross braces, provides the supporting foundation for the entire cash drawer assembly. Thus, as shown in Figures 5 and 7, the cross braces 58 underlie the sheet metal top panel of the upper section to reinforce it against the weight load of the business machine and the base flange 61 rests against the bottom panel of the lower section. The stresses are thus transmitted through the cross braces and internal frame directly to the supporting surface without imposing any force upon the sheet metal housing sections or other parts of the unit.

The internal frame also slidably supports the cash drawer proper which is indicated generally at 18. For this purpose, as shown in Figures 5 and 8, the extruded side rails 57 are provided with a series of drawer support rollers 77 which are journalled upon screw threaded studs 78 passing through the web 63 of the side rails and secured in position by nuts 80. The rollers are preferably of the ball bearing type to provide smooth, easy operation and the cash drawer includes a channel 81—81 along its opposite side edges straddling the rollers. The rollers are slightly smaller in diameter than the width of channel 81 in order to provide clearance between the lower flange of the channel and rollers. The channels 81 form an integral part of the side walls 82—82 of the cash drawer, these walls also being formed by the extrusion process preferably of aluminum or aluminum alloy.

It will be noted in Figure 8 that the lower edge of side wall 82 includes a horizontal rail 83 extending outwardly from the plane of the side wall. Rail 83 tracks against a roller 85 which is journalled upon a vertical axis, the roller being mounted upon a spacer 86 having a stub shaft 87 at its upper end. The spaced rollers 85 thus confine the cash drawer against lateral movement and are effective to reduce friction and provide smooth action.

The bottom 88 of the drawer, as best shown in Figure 8, is supported upon the horizontal rails 83—83 and the drawer includes the cross member 25 at its inner end, an intermediate cross partition 90 and a forward cross member 91. The side walls 82—82 are secured to the cross members by means of screws.

In order to prevent the drawer assembly from being withdrawn or propelled completely from its housing by accident, there is provided a latch member 92 (Figures 5 and 7) consisting of a flat metal plate slidably mounted for vertical movement with respect to the cross member 25. The latch member includes an elongated slot 93 traversed by screws 94—94 threaded into the cross member and is further provided with a flanged upper end 95 for finger engagement. The lower end of the latch projects downwardly below the plane of the bottom of the drawer and is slotted as at 96 to slidably embrace a rail 97 which forms a part of the lower housing section.

Toward the forward end of the housing there is provided a stop plate 98 (Figure 8) adapted to engage the latch member when the drawer approaches its fully extended position. The stop plate 98 is a modified Z-shape in cross section providing a flange 100 adapted to abut the latch plate. The stop plate is secured to the bottom of the housing by rivets 101.

The latch plate 92, combined with the stop member 98, is effective to prevent complete withdrawal of the drawer; however, in the event that removal is necessary, the latch plate may be elevated by reaching into the partially open drawer, thus clearing the stop plate and allowing the drawer to be withdrawn completely from its housing.

Under automatic operation, the action of the coil springs 23 is such that the drawer springs automatically to a partially opened position giving access to the forward money compartments which are indicated generally at 102 and 103 and described in detail later. If access is to be had to the rearward drawer compartment 104, the drawer can be easily pulled by hand to a fully extended position.

In addition, to the structure so far described, the forward end of the drawer is provided with a key operated cylinder lock 105 adapted to lock it securely in closed position. Lock 105 is a duplicate of lock 70 previously described, and includes a rotatable barrel carrying a locking finger 106 which is rotated when a key is inserted in the lock and rotated. In the position shown in Figure 5, the drawer is in locked position, the finger 106 being engaged in a slot 107 which is formed in the horizontal flange 100 of the stop plate 98 previously described. When the drawer is unlocked, finger 106 is swung to an elevated position above the flange 100 so as to avoid any interference with the opening and closing of the drawer.

*Drawer latching mechanism*

As explained earlier, the drawer is held normally in closed position by the rearward end of the trip or release plate 22 which engages the cross member 25 of the drawer (Figures 4 and 5). The pivotal mounting 24 of the release plate comprises a pair of angular lugs 110—110 secured by screws 111 to the internal frame 56 and the lugs pivotally mount the opposite ends of the pivot pin 112. Pivot pin 112 is confined beneath the release plate, the plate having depressed areas 113—113 at opposite sides delineated by openings 114—114 through which the pivot pin projects. As explained earlier, the release plate has a large working area extending transversely and longitudinally to provide as great a contacting area as possible within which the plunger or depressing means may be located.

It will be noted that release plate 22 tapers rearwardly, starting at the pivot pin and terminating at the cross member 25 of the drawer, providing a rearward extension or latch plate 115. As viewed in Figure 5, the latch plate 115 also is inclined downwardly from the pivot pin toward the cross member 25 in such manner that a slight downward tilting movement of the release plate causes release of the drawer (Figure 6).

After plate 22 is depressed and released by rotation of cam 28, the plate is urged back to the normal position shown in Figure 5 by a flat spring 116. Spring 116 is anchored in the release plate by means of a rivet 117, the end of the spring confined beneath the plate in an offset portion 118, which is slotted as at 120 to receive the end of the spring. The free rearward end of the spring 116 engages the top flange of cross member 58 as best shown in Figure 5 and thus urges the release plate constantly in the level position shown.

When the drawer is pushed back to closed position, its cross member 25 contacts the downwardly inclined latch plate 115 and momentarily elevates it as the drawer approaches final position. As the cross member 25 clears the rearward end of the latch plate 115, the flat spring snaps the plate downwardly to the latching position shown in Figure 5. After the drawer is latched, the coil springs 23 force the cross member into engagement against the end of the latch plate which remains in this position until it is tripped either by the cam and plunger or by a manual release mechanism under control of the release button 121 (Figure 2) as explained later.

In order to provide means for adjusting the position of the drawer in closed position with respect to its housing, the latch plate 115 includes an adjustment plate 122 which is adjustable longitudinally with respect to the latch plate and provides the abutment for the drawer. As shown in Figures 4 and 5, plate 122 is located beneath plate 115 and its rearward end is doubled upon itself as at 123, loosely embracing the rearward end of the plate. The adjustment plate is secured in position by the screws 124—124 which pass through the slots 125—125 as shown in Figures 13. The screws include nuts 126—126 which bear upon the under surface of the adjustment plate and clamp it longitudinally in adjusted position.

Upon assembly of the unit, the drawer is positioned with its outer end flush with the outer end of the drawer housing as shown in Figure 5, with the top section removed. The adjustment plate is then shifted with respect to plate 115 to bring its end 123 into engagement with cross member 25 and the screws 124—124 are tightened to lock the plate permanently in adjusted position.

The manual release button 121, as explained earlier, permits the cash drawer to be opened independently of the business machine, the button being arranged to trip the release plate upon being depressed. For this purpose there is provided a rock shaft 127 having its opposite ends loosely journalled in bearings 128 secured to the cross braces 58 as shown in Figures 4 and 5. To the outer end of rock shaft there is secured a lateral arm 130 having its free end disposed beneath the release button 121. The release button is mounted upon the end of a flat springs 131 (Figure 9) having a locking pin 132 overhanging one side of arm 130. Upon the rearward end of shaft 127, there is fixed a second arm 133 which extends in the same direction as arm 130 and overlies the forward edge of the release plate. Downward movement of release button 121 is thus imparted by way of rock shaft 127 to the release plate, causing the plate to be swung to release position when the button is depressed.

In order to prevent manual release of the drawer when necessary, a lock 134 (Figure 2) is mounted in the upper section adjacent the release button. As best shown in Figure 8, lock 134 is of the cylinder type previously described and includes a rotary barrel 135 having an arm 136 which is adapted to underlie the lower end of the locking pin 132 when swung to locked position. In this position, the release button cannot be depressed and the cash drawer can be opened only by the operation of the autographic register, or adding machine.

As best shown in Figures 5, 11 and 12, the coil springs 23 are mounted upon an angle bracket 137 having its base riveted as at 138 to the bottom of the housing. The ends of the springs are anchored upon the bracket by means of the anchor strips 140 which engage the bottom coil of the springs and clamp them against the bracket. The anchor plates are secured in position by means of the screws 141—141. The free length of the springs is shown in Figure 6 and they are compressed to the length shown in Figure 5 when the drawer is closed.

The apparatus is arranged to sound a bell each time the cash drawer is shifted by the coil springs to its open position. As best shown in Figures 11 and 12, the bell 142 is mounted by a rivet 143 upon the bottom of the housing just below the bottom of the drawer. A striker 144, pivotally mounted as at 145 upon a bracket 146, is actuated in a simple manner by one of the coil springs during the initial opening movement of the drawer.

For this purpose, the striker includes a spur 147 projecting between the intermediate coils of the left hand spring as shown in Figure 12. When the drawer is released, one of the coils of the expanding spring, as indicated at 148, engages the spur 147, and in moving forwardly, causes the striker to be swung or retracted away from the bell. During its rearward or cocking movement, the striker contacts a flat spring 150 which is fastened by a screw 151 to the coil spring bracket 140. The striker includes a lug 152 which projects rearwardly in a direction to engage the free end of flat spring 150 so as to deflect the spring rearwardly as the striker is cocked. As coil 148 continues its forward motion, the striker 144 and its spur 147 are angulated to such an extent that the coil slides over the spur. Immediately upon release, the energy stored in the flat spring 150 propels the striker forwardly causing it to strike the bell at the same time the drawer springs open.

When the drawer is pushed to closed position, the coil 148 which slipped over the spur, now engages the inclined forward surface 153 of the spur with the forward end of the striker engaged against the bell. The movement of the coil combined with the angle of the incline 153, produces a camming action, causing the coil to deflect sufficiently to snap behind the spur to the position shown in Figure 12. The striker is thus reengaged and ready to be actuated the next time the drawer is opened.

It will be noted that the striker is propelled under momentum by the flat spring 150 and is free to bounce away from the bell after striking it. This provides a clear sustained signal since ample clearance, as shown in Figure 12, is provided between the flat spring and spur 147. The spur is also completely clear of the coil spring by virtue of the wide spacing of the coils when the spring is relaxed.

Drawer compartments

As best shown in Figures 4 and 5, the money compartment of the cash drawer indicated generally at 103, is provided with three bill compartments delineated by the separators 155. The separators extend longitudinally from the cross partition 90, through the coin compartment 102, to the forward end of the drawer. Each bill compartment is provided with a hinged currency flap 156 having an end pivotally mounted as at 157 in a U-shaped bracket 158 secured to partition 90. The flaps are formed of sheet metal and are adapted to be swung upwardly when the bills are inserted or removed from the compartments.

In order to provide convenient handling of the flaps, each is provided with a relatively large curl 159 at its forward swinging end, adapted to hold the flap in an elevated position with respect to the top bill of the stack. A finger opening 160 (Figure 4) of elongated configuration is formed in each flap. The opening allows the user to insert his finger through the opening and under the flap at its curled end so that the flap may be raised conveniently in handling the bills.

When the drawer is pulled outwardly a sufficient distance, the flaps can be swung beyond vertical to a rearwardly inclined position where they are held up by engagement against the upper edge of their U-shaped brackets. Since the flaps swing open in a direction facing the outer end of the drawer, the elevated flaps are automatically lowered, when the drawer is pushed to closed position, by engagement against the upper edge of the drawer housing. The flaps are simple in structure, and the curl and finger holes cooperate to provide ample space for convenient finger engagement.

The change compartments indicated generally at 102 are extended across the forward end of the drawer and separated from one another by the longitudinal separators 155 as explained above. The change compartments also extend along the right hand side of the drawer, as shown in Figure 4 and are duplicates of those extending across the forward end of the drawer except that they are located side-by-side. The change compartments are constructed of aluminum extrusions for utmost simplicity and offer certain advantages in the handling of coins by virtue of their smooth finish and configuration.

As best shown in Figure 5, each extrusion consists of a partially cylindrical trough 161 having integral vertical webs 162 and 163 extending along its opposite sides adapted to support the extrusion upon the bottom of the drawer. For this purpose, the lower edge of each web includes an inturned flange 164 which is secured by screws 165 to the bottom of the drawer. In addition, the upper edge of the forward web 163 includes an overhanging flange 166 which supports the sheet metal cross member 91 of the drawer. For this purpose, the upper portion of the member 91 is clinched over upon the top flange as at 167.

The extrusions for the coin compartments are furnished in fairly long sections, and at assembly are simply cut to the required length. After being inserted between the separators, the flanges may be tapped and drilled in assembly for the fastening screws. The compartments along the side of the drawer are also cut from the identical extruded section and installed in side-by-side relationship as indicated. These compartments are also attached by means of screws as explained above. The use of elongated extrusions reduces costs because they are inexpensive; moreover, it imparts flexibility of structure since the number of compartments can be changed simply by cutting the compartments to different lengths and installing the necessary separators.

Having described my invention, I claim:

1. A cash drawer unit comprising a drawer housing having a top panel and an open end, a cash drawer slidably mounted within said housing and movable in a horizontal plane outwardly with respect to the open end of the housing, a tiltable latching plate mounted upon a pivot line, the latching plate being disposed within said housing beneath the top panel thereof and above said drawer, the latching plate having a release area of substantial extent projecting forwardly from said pivot line toward the open end of the housing and transversely of the housing substantially for the full width of the housing, said release area residing in a plane substantially parallel with the top panel, the latching plate having a latching portion extending rearwardly beyond said pivot line, said drawer having a cross member at its rearward end adapted to abut the rearward end of said latching portion to latch the drawer in closed position, spring means mounted within the housing and engaged against the cross member of the drawer to urge the drawer into abutment with said latching portion, a shiftable plunger, a plunger tube slidably supporting the said plunger, said tube having a lower end portion projecting through the top panel of the drawer housing, and clamping means on said tube engaging the top panel and supporting the tube and plunger in vertical position with the lower end of the plunger projecting from the tube and resting upon the release area of the latching plate, the substantial extent of the release area providing selective location of the plunger within the confines of the release area, whereby a business machine may be mounted upon the top panel of the housing and interconnected with said plunger to shift the same and cause the drawer to spring open upon operation of the business machine.

2. A cash drawer unit comprising a drawer housing having a top panel, a closed end, and an open end, the top panel being adapted to support a business machine, an internal frame disposed within said housing, said frame having transverse elements disposed beneath said top panel, said frame being generally U-shaped in the horizontal plane and having its closed end disposed toward the closed end of the housing, said internal frame having longitudinal framing members extending lengthwise within opposite sides of the drawer housing, a cash drawer, means on said longitudinal framing members supporting the drawer for movement in the horizontal plane, a tiltable latching plate disposed within the housing above the drawer, pivot pins extending transversely from the opposite side edges of the latching plate intermediate the length thereof, a pair of pivot lugs mounted on said longitudinal framing members at opposite sides, said pivot pins pivotally journalled in said pivot means, said latching plate residing between said longitudinal framing members and having a latching portion extending rearwardly from the pivot pins toward the closed end of the frame, said portion engaging and latching the drawer in closed position, said latching plate having a release area residing forwardly of said pivot pins, said release area transversely spanning the space between the longitudinal framing members and being stabilized laterally by said pivot pins, a movable release plunger projecting vertically through the top panel and having its lower end resting upon the release area at a point intermediate the pivot pins and forwardly thereof, the release plunger tilting the latching plate to a drawer release position upon downward motion of the release plunger, and spring means mounted within said housing and engaged against the drawer, said spring means urging the drawer toward open position, the release plunger being engaged and shifted downwardly by a movable element of the business machine supported on said top panel, whereby the cash drawer is unlatched by said movable element upon operation of the business machine.

References Cited in the file of this patent

UNITED STATES PATENTS

| | | |
|---|---|---|
| 573,942 | Watson | Dec. 29, 1896 |
| 856,374 | Staples | June 11, 1907 |
| 1,520,727 | Sippert | Dec. 30, 1924 |
| 1,569,043 | Showers | Jan. 12, 1926 |
| 1,596,688 | Showers | Aug. 17, 1926 |
| 1,647,942 | Tindall | Nov. 1, 1927 |
| 1,673,639 | Poole | June 12, 1928 |
| 1,700,352 | Dunning | Jan. 29, 1929 |
| 1,743,084 | Kimberly | Jan. 7, 1930 |
| 1,793,760 | Stern | Feb. 24, 1931 |
| 1,820,400 | Showers | Aug. 25, 1931 |
| 1,840,485 | Butler | Jan. 12, 1932 |
| 1,854,178 | Butler | Apr. 19, 1932 |
| 2,143,292 | Wheelbarger | Jan. 10, 1939 |
| 2,176,913 | Mandel | Oct. 24, 1939 |
| 2,607,526 | Boyden et al. | Aug. 19, 1952 |